United States Patent [19]

Baskin et al.

[11] 3,757,374

[45] Sept. 11, 1973

[54] MAGNETIC TAPE CLEANER

[75] Inventors: John Y. Baskin, North Tonawanda; Miles D. Bender, East Amherst; Robert D. Daugherty, North Tonawanda, all of N.Y.; Charles L. Fontana, Levittown, Pa.; Samuel G. Johnson, Snyder, N.Y.

[73] Assignee: Syncom Incorporated, Buffalo, N.Y.

[22] Filed: June 21, 1972

[21] Appl. No.: 264,819

[52] U.S. Cl. .............................. 15/93 R, 15/236 NO

[51] Int. Cl. .............................. B08b 1/02, G11b 5/00

[58] Field of Search ............. 15/93 R, 308, 236 NO; 134/9

[56] References Cited

UNITED STATES PATENTS

| | | | |
|---|---|---|---|
| 3,616,478 | 11/1971 | Martz et al. | 15/93 R |
| 3,083,387 | 4/1963 | Wilkins | 15/93 R |

*Primary Examiner*—Leon G. Machlin
*Attorney*—Conrad Christel and Edwin T. Bean, Jr.

[57] ABSTRACT

Apparatus for cleaning magnetic tape wherein tape is transported from a supply reel into scraping or wiping contact with the edge of a blade and then onto a take-up reel. The blade has a plurality of cutting edges and a length at least twice the width of the tape to be cleaned. A portion of the blade is releasably held in a chamber of a blade holding member in a manner exposing a portion of the blade length at least equal to the width of the tape. The blade holding member, in turn, is selectively rotatably connected in the apparatus so that each of the blade edges can be used in succession. When all the exposed edges of the blade have been used, it is removed from the holder and reinserted with the previously unexposed portion ready for use thereby doubling the useful blade life. Each tape reel is held on the apparatus by a hub assembly having an expander which is urged radially outwardly by an axially movable clamping means into firm contact with a surface of the reel center opening thereby compensating for different size openings of various reels.

7 Claims, 8 Drawing Figures

MAGNETIC TAPE CLEANER

BACKGROUND OF THE INVENTION

This invention relates to magnetic tape transport apparatus, and more particularly to a new and improved apparatus for cleaning magnetic recording tape.

It is extremely important to remove contaminants from magnetic tapes used in analog and digital computers for scientific and business data processing operations as well as magnetic tapes used for audio and video recordings. Contaminants present on the surface of the tape can cause errors by their tendency to move the tape away from the magnetic recording or reading heads of the apparatus on which the tapes are used. Contamination can come from external sources such as dust, smoking, careless handling of the tape, and from contaminants present on the tape containers or the tape transport apparatus. Another source of contamination is wear of the tape itself during use. In particular, magnetic tape consists of a plastic film having a coating of magnetic material commonly in the form of ferrous oxide, and the oxide coating on the tape must have physical contact with the tape transport apparatus in order for information to be stored or retrieved. This repeated wear can cause particles to be broken loose from the oxide layer which particles unless removed can cause problems as described above.

In one form of magnetic tape cleaning apparatus heretofore available the tape is passed over a single blade which scrapes the surface of the tape. The hardness and roughness of the oxide coating of the magnetic tape causes the blade to wear rapidly thereby requiring frequent replacement. In some forms of magnetic tape cleaning apparatus heretofore available, it is difficult or even impossible to use different types of blades with the apparatus. It would be highly desirable to provide a magnetic tape cleaning apparatus which solves these problems and which is effective in operation, simple to use and maintain, and which is small in size so as to be portable. It also would be highly desirable to provide such apparatus in which the tape transport thereof can accommodate variations in the center openings of tape reels.

SUMMARY OF THE INVENTION

It is, therefore, an object of this invention to provide a new and improved magnetic tape cleaning apparatus of the type having a blade for cleaning the tape which apparatus significantly increases the useful life of the blade.

It is a more particular object of this invention to provide such apparatus which is readily compatible with various types of blades.

It is a further object of this invention to provide magnetic tape transport apparatus, such as magnetic tape cleaning apparatus, which compensates for size variations in reels on which tape is wound.

It is a further object of this invention to provide such magnetic tape cleaning apparatus which is relatively small in size and light in weight so as to be portable.

It is a further object of this invention to provide such magnetic tape cleaning apparatus which is effective in operation, relatively inexpensive, and easy to use and maintain.

The present invention provides apparatus for cleaning magnetic tape wherein tape is transported from a supply reel into scraping or wiping contact with a blade to remove surface contaminants and then onto a take-up reel. The blade has a plurality of cutting edges and a length at least twice the width of the tape to be cleaned. A blade holding means connected in the apparatus holds the blade in a manner whereby a portion of the length of the blade is exposed for use, the blade can be moved to place the different cutting edges thereof successively in contact with the tape surface, and then the blade can be removed and reinserted in the holding means in a manner exposing for use the previously unexposed portion of the length of the blade. Each tape reel is held on an assembly mounted on a shaft of the apparatus which assembly includes an expander means thereon which is urged radially outwardly relative to the shaft by an axially movable clamping means into firm contact with a surface of the reel center opening.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENT

Figure 1:
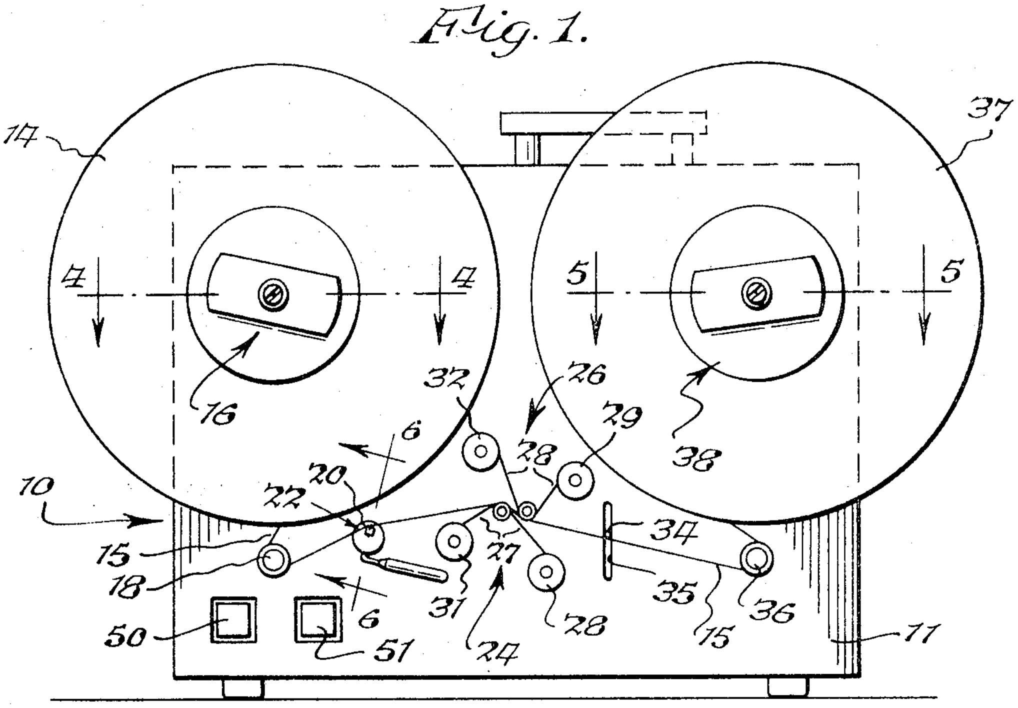
FIG. 1 is a front elevational view of magnetic tape cleaning apparatus according to the present invention.
Figure 2:
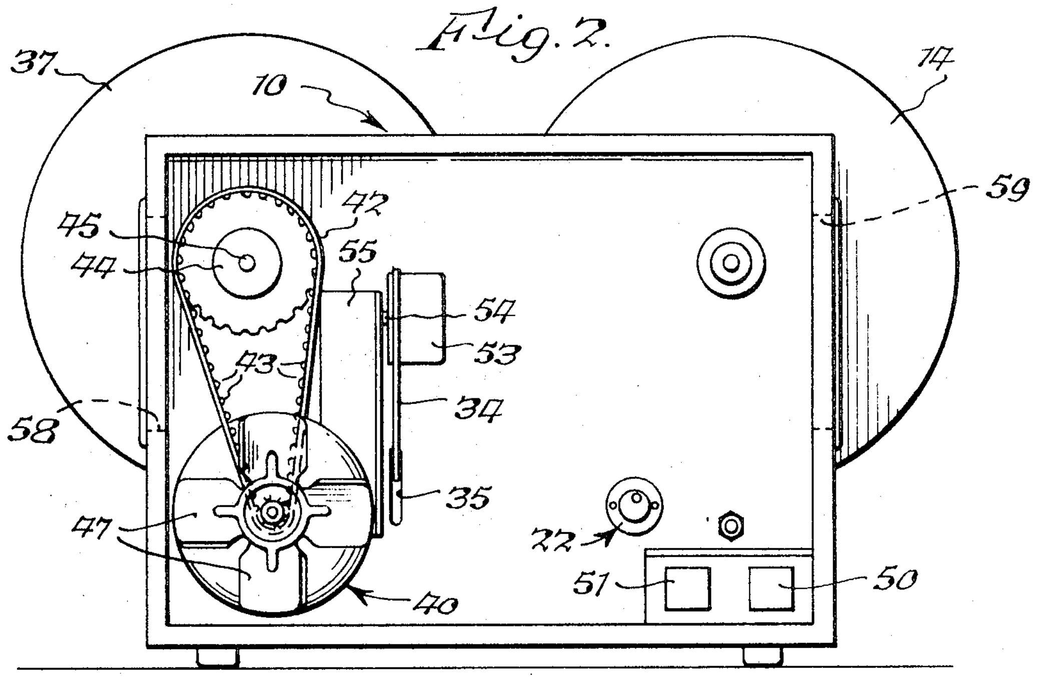
FIG. 2 is a fragmentary, rear elevational view of the apparatus of FIG. 1.
Figure 3:
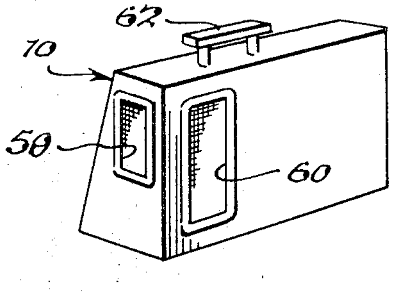
FIG. 3 is a perspective view of the apparatus of FIG. 1 illustrating the housing thereof.

Referring now to FIGS. 1–3, there is shown at 10 a housing having a front wall or panel 11 on which is supported a tape transport according to the present invention. A supply reel 14 on which is wound magnetic tape 15 to be cleaned is positioned on a reel holding means 16 of the present invention which will be described in further detail presently. Tape 15 from supply reel 14 passes around a first guide roller 18 rotatably connected in panel 11 and then over a blade 20 which is held in position by a blade holding means 22 according to the present invention. The construction of means 22 and the manner in which it holds blade 20 will be described in further detail presently. Magnetic tape 15 then is drawn past a pair of wiping devices 24 and 26. In each of the wiping devices, a respective face of the magnetic tape 15 is drawn across a porous cleaning tape, for example tissue, as indicated at 27 and 28. The cleaning tapes are supported by posts connected in panel 11 and are gradually replenished from supply spools 29, 30 and are collected on take-up spools 31, 32. Spools 29, 30 and spools 31, 32 are rotatably connected in panel 11. Upon leaving the wiping devices 24, 26 magnetic tape 15 passes in engagement or contact with a tape sensing means 34 extending through a slot 35 in panel 11 and tape 15 passes around a second guide roller 36 rotatably connected in panel 11 whereupon it is wound onto a take-up reel 37 which is positioned on a reel holding means 38 according to the present invention. Holding means 38 on which reel 37 is placed is identical to holding means 16 of the present invention as will be apparent hereafter.

As shown in FIG. 2, reel holding means 38 on which take-up reel 37 is positioned is rotated at a constant speed by means of a motor 40 positioned within housing 10 which motor is coupled through a belt 42 provided with ribs or teeth 43 and a gear 44 to the shaft 45 of hub assembly 38. In the apparatus of the present invention, a fan 47 is connected directly on the shaft of motor 40 for cooling the apparatus in a manner which presently will be described. Motor 40 is suitably mounted within housing 10, and electrical power from a standard 60 cycle a.c. outlet is connected to motor 40 in a conventional manner and under control of switches which are manually actuated by means of push buttons 50, 51 also shown in FIG. 1. For example, push button 50 can operate a switch in the power circuit for motor 40 and pushbutton 51 can operate a switch controlling run and standby conditions of motor 40. Tape sensing means 34 according to the present invention comprises an arm or lever extending from slot 35 within housing 10, as shown in FIG. 2, and mechanically connected to a housing 53 containing a mercury switch or similar position responsive switching means, which housing 53 is pivotally connected at 54 to a bracket 55 mounted on the inner surface of panel 11. The presence or absence of tape 15 determines the position of sensing means 34 which controls the orientation of housing 53 about the pivot axis 54 which, in turn, determines the electrical condition of the switch in housing 53 which can be employed to stop motor 40 in the absence of tape 15 as sensed by arm 34. Switch 53 preferably is connected in controlling relation to a relay which, in turn, is connected in the power circuit of motor 40.

Figures 4, 5:
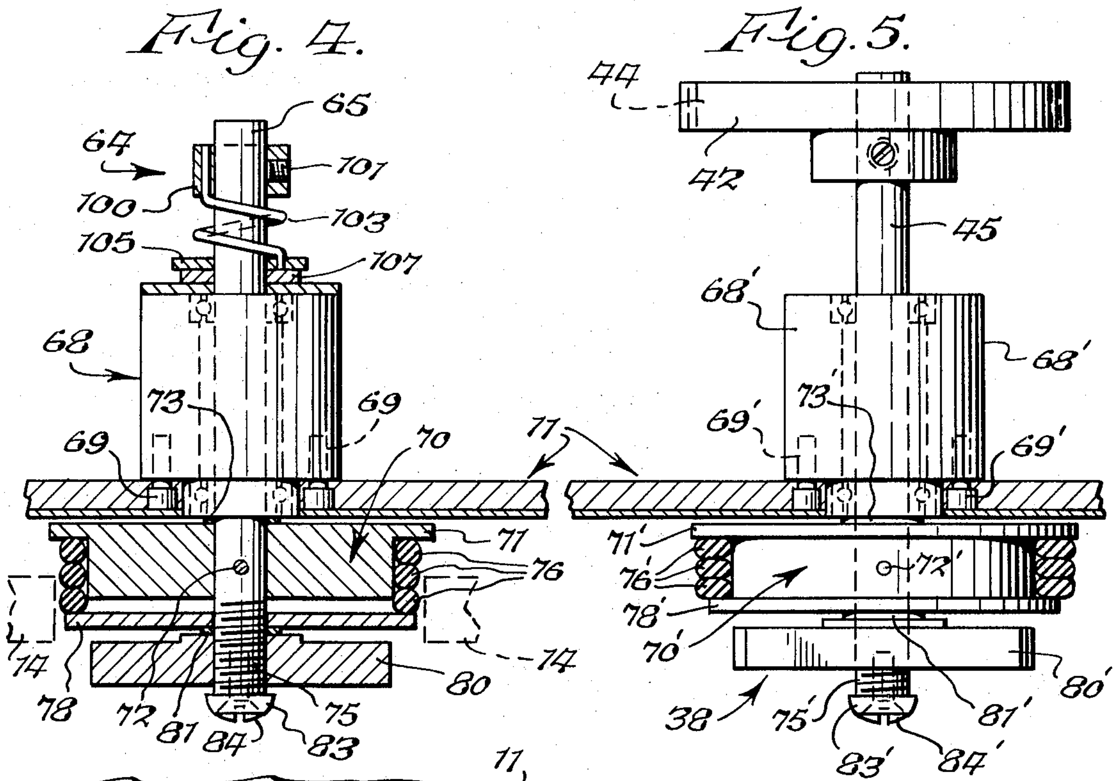
FIG. 4 is a fragmentary sectional view taken about on line 4—4 in FIG. 1.
FIG. 5 is a fragmentary sectional view taken about on line 5—5 in FIG. 1.

As shown in FIGS. 2 and 3, the apparatus of the present invention is provided with air passages 58, 59 in opposite side walls of housing 10 and with an air passage 60 in the rear panel of housing 10 adjacent fan 47 as shown in FIG. 3. In preferred form each passage is of substantial cross sectional area and a screen or similar mesh-like material is placed across the passage. A handle 62 is provided on housing 10 to facilitate carrying thereof. As shown in FIG. 4, the apparatus of the present invention further comprises means generally designated 64 connected on a shaft 65 of reel holding means 16 for applying a constant tension to tape 15 and will be described in detail presently.

Reel holding means 16 of the present invention is illustrated in further detail in FIG. 4. Shaft 65 extends through panel 11 and is rotatably supported in a bearing housing 68 which is mounted by means of screws 69 or the equivalent to the inner surface of panel 11. A wheel-like member 70 provided with a hub portion and having a disc-like portion or radial flange 71 is fixed on the portion of shaft 65 which extends outwardly from panel 11 by means of a roll pin 72. Member 70 is positioned with a flange portion 71 adjacent panel 11 and spaced from panel 11 by means of a washer 73 or similar spacing means. The remaining, exposed portion of shaft 65 is provided with threads 75. An expander means of resilient material is positioned on the hub of wheel 70. In particular, a plurality of annular members of resilient material, for example three rubber O-rings 76 shown in FIG. 4, are placed on the hub of wheel 70 side-by-side in the annular space between the peripheral flange 71 of wheel 70 and a clamping means comprising a disc member 78 axially adjacent the O-rings 76 and having a central aperture of a diameter sufficient to permit movement of disc 78 on shaft 65 and a locking member 80 having a threaded central aperture whereby it is connected on the threads 75 of shaft 65. The outer diameter of disc 78 must be greater than the diameter of the hub portion of wheel 70 so that disc 78 can apply force axially against O-rings 76, and the diameter of disc 78 must be small enough to fit within the center openings of tape reels. The number and individual size and diameter of O-rings 76 is such that in their normal unexpanded condition they space disc 78 a small axial distance from the hub of wheel 70 and that a reel can be placed on wheel 70 in a manner such that the hub portion and expander means extend into the central opening of the reel as illustrated in FIG. 4. Locking member 80 is in the form of a generally bar-shaped planar member to facilitate manual operation thereof, and is curved at opposite ends as seen in FIG. 1 to enhance the appearance thereof. A spacer member or washer 81 of Nylon or similar material is positioned on shaft 65 between locking member 80 and disc 78. A finishing washer 83 is connected by means of a screw 84 on the outer end of shaft 65.

Hub assembly 38 according to the present invention is identical in construction to that of hub assembly 16 and is shown in detail in FIG. 5. In particular, shaft 45 is rotatably supported in a bearing housing 68′ mounted by means of screws 69′ to panel 11. A wheel means 70′ having a hub portion and a radial flange 71′ is fixed on shaft 45 by means of a roll pin 72′ and flange 71′ is spaced a small distance from panel 11 by a spacer or washer 73′. An expander means in the form of a plurality of O-rings 76′ is positioned on the hub of wheel 70′ between wheel portion 71′ and a clamping means comprising a disc member 78′ and a locking member 80′ Which is connected on threads 75′ of shaft 45 and spaced from disc 78′ by a spacer or washer 81′. A finishing washer 83′ is connected on the end of shaft 45 by a screw 84′. Hub assembly 38 is shown in FIG. 5 with locking member 80′ tightened on threads 75′ and urging disc member 78′ axially against the expander or O-rings 76′ which are expanded in a radial outward direction relative to wheel 70′ for a purpose which will be described.

Referring again to FIG. 4, there is shown in detail means 64 according to the present invention for applying tension to tape 15 during operation of the apparatus. Means 64 comprises a collar member 100 which is positioned on and movable axially along shaft 65 and which is fixed on shaft 65 at a desired location by locking means in the form of a set screw 101. A coil spring 103 surrounding a portion of shaft 65 has one end thereof fixed in collar 100. Spring 103 functions as a brake spring. The other end of spring 103 is fixed in a metal washer member 105 freely positioned on shaft 65, member 105 serving as a brake shoe. A brake felt member 107 having the shape of a washer is secured to the surface of brake shoe member 105 opposite spring 103 for movement with member 105 and in rubbing contact with a brake facing member 109 fixed on the end surface of bearing housing 68. Any wear in brake felt member 107 or brake facing member 109 is taken up by spring 103 which urges members 107 and 109 into rubbing contact.

Figures 6, 7, 8:
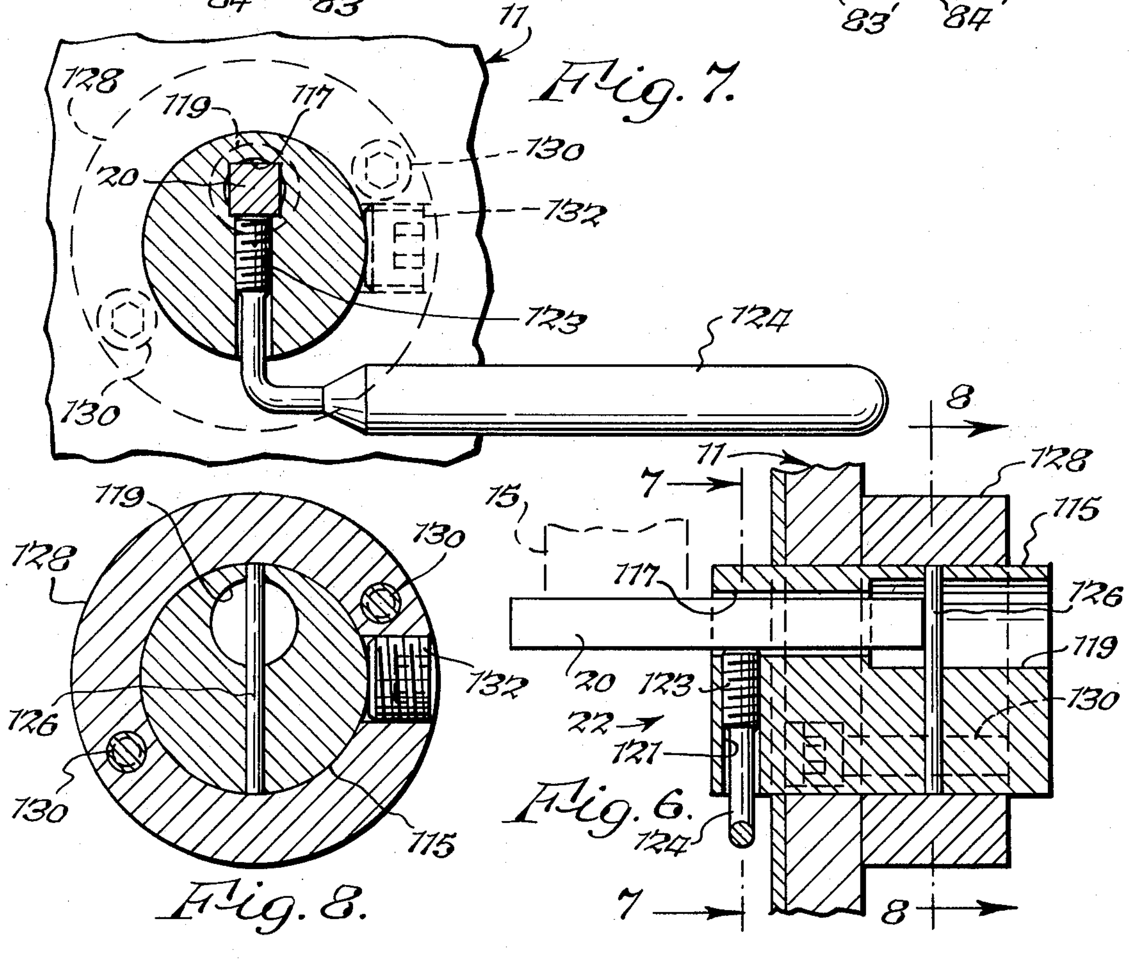
FIG. 6 is a fragmentary sectional view taken about on line 6—6 in FIG. 1.
FIG. 7 is a sectional view taken about on line 7—7 in FIG. 6.
FIG. 8 is a sectional view taken about on line 8—8 in FIG. 6.

FIGS. 6–8 illustrate in detail the blade holding means 22 according to the present invention. Blade 20 as shown in FIGS. 6 and 7 is in the form of an elongated bar of rectangular, in particular square, cross section have four sharp right angle cutting edges. A preferred material for blade 20 is tungsten carbide. Blade 20 has a length at least twice the width of tape 15 to be cleaned, and preferably the length of blade 20 is slightly greater than two times the width of tape 15 as shown in FIG. 6. Blade holding means 22 according to the present invention comprises a substantially solid member 115 having a circular cross section thereby providing a cylindrical outer surface. Member 115 is provided with a chamber or interior region for receiving blade 20, and in the present illustration there is provided a first region 117 for receiving blade 20 in a relatively snug-fitting relationship but which permits slidable or longitudinal movement of blade 20 therein, and a slightly larger second region 119 extending from region 117 along the remaining portion of the length of member 115. Region 117 and a portion of region 119 thus define a chamber for receiving blade 20. One convenient method of forming regions 117 and 119 is by drilling or boring and broaching, whereupon four right angle cutout would be provided at appropriate spaced locations around the circumference of bore defining region 117. Member 115 further comprises locking means movably connected therein and extending into the chamber thereof for releasably holding blade 20 therein. In preferred form the locking means comprises an internally threaded bore 121 receiving a set screw 123 provided with an extension or handle 124 for convenient manual loosening and tightening thereof. Blade holding means 22 further comprises stop means for controlling the amount or extent by which blade 20 extends into the chamber thereby to control the portion of the length of blade 20 which is exposed and extends from member 115 for contacting tape 15. In the present instance member 115 is provided with a roll pin 126 which is driven through a bore or aperture provided in member 115 and located so that pin 126 extends across region 119 so as to contact or abut an end of blade 20 when the blade is inserted into the chamber of holding means 22.

The apparatus of the present invention further comprises means for selectively rotatably connecting blade holding means 22 to the supporting surface provided by panel 11. In particular, panel 11 is provided with a circular opening having a diameter at least equal to the diameter of member 115, and member 115 is placed through the opening in a manner whereby access to region 117 and handle 124 is possible from the front of panel 11. There is provided a sleeve member 128 having an inner diameter substantially equal to the outer diameter of element 115 which sleeve member is positioned on member 115 in concentric relationship therewith and fastened or mounted to panel 11 by means such as screws 130. As a result, member 115 is rotatably received and supported in the opening provided in panel 11 and within sleeve member 128. There is provided locking means in the form of a set screw 132 movably connected in member 128 and extending through the inner surface of sleeve member 128 for engaging or contacting a portion of the outer surface of member 115 for locking member 115 in a selected rotational position thereof.

The apparatus of the present invention operates in the following manner. Reel 14 containing magnetic tape to be cleaned is placed on holding means 16 in a manner such that the hub portion of wheel 70 and the expander means or 0-rings 76 are within the central opening of reel 14. With most reels, a relatively small circular gap or clearance exists between the outer or peripheral surface of 0-rings 76 and the surface of the reel central opening. Then locking member 80 is grasped by hand and twisted or rotated so as to move disc 78 axially against 0-rings 76 whereby they are forced radially outwardly to assume a shape as shown in FIG. 5 so that the 0-rings 76 take up or fill the gap or clearance. As a result, reel 14 is firmly held on means 16 for rotation with shaft 65. Normally, locking member 80 will require a twisting or rotary motion through an arc of less than 360° thereby enhancing the ease and simplicity by which tape reels are connected on the apparatus. An empty take-up reel 37 is placed on holding means 38 which is operated in a manner identical to that of holding means 16 whereby reel 37 is firmly held for rotation with shaft 45.

Tape 15 is pulled by hand from reel 14 around guide roller 18, over the upwardly directed edge of blade 20, as shown in FIG. 1, over the first post supporting tissue 27 and under the second post supporting tissue 28, under sensing arm 34, and around guide roller 36 whereupon is connected to reel 37. Tape 15 supports arm 34 in a manner placing the mercury switch in housing 53 in a first position or state. As shown in FIG. 1 tape 15 changes direction slightly after it leaves the edge of blade 20. The relative angles at which tape 15 approaches and leaves the edge of blade 20 can be adjusted simply by loosening locking means or set screw 132 in sleeve 128 and then manipulating handle 124 which is connected in blade holding member 115. Handle 124 is moved through a vertical plane as viewed in FIG. 1 to rotate blade holder 115 about its longitudinal axis thereby also rotating blade 20 about its longitudinal axis, since the longitudinal axis of blade 20 is parallel to the longitudinal axis of blade holding means 22. As a result, the angle at which tape 15 approaches the cutting edge of blade 20 can be made equal to, greater than or less than the angle at which tape 15 leaves the cutting edge of the blade. In the present illustration of FIG. 1, the angle of approach between tape 15 and the adjacent face of blade 20 is greater than the angle of exit between tape 15 and the adjacent face of blade 20. Furthermore, with set screw 132 loosened and by further manipulation of handle 124, any one of the four exposed cutting edges of blade 20 can be moved into position in scraping or rubbing contact with tape 15. When the desired blade cutting edge as well as the particular angles are obtained, locking means or set screw 132 is tightened thereby locking blade holding member 115 in the selected rotational position thereof.

The apparatus now is ready to be placed in oeration whereby the electrical power circuit for motor 40 is completed by pressing of button 50 whereupon motor 40 operates to rotate gear 44 and shaft 45 in response to pressing of button 51. Reel 37 is rotated to pull tape 15 through the apparatus until it has been completely unwound from reel 14 at which time arm 34 will drop moving switch 53 into a second position or state deenergizing motor 40 and causing the apparatus to stop.

Cleaning of tape 15 is accomplished by blade 20 which shears the contaminants from the oxide surface of the tape followed by cleaning of both surfaces of the tape by the tissue members 27 and 28 to insure final removal of the contaminants. When tape 15 is cleaned and reel 14 is completely unwound, reels 14 and 37 are removed from the apparatus simply by twisting or rotating locking members 80 and 80' in the opposite directions so as to permit discs 78 and 78' to move axially along shafts 65 and 45, respectively, away from the corresponding wheels 70, 70' thereby allowing 0-rings 76 and 76' to return to their normal unexpanded condition to permit removal of the reels.

After one of the cutting edges of blade 20 has been used for a time, blade 20 can be rotated to place another cutting edge in position for use in the manner described above. Thus the various blade edges can be moved into position for use successively in a convenient and easy manner simply by loosening set screw 132 in sleeve 128 and then by manipulating handle 124 to rotate blade 20 about its longitudinal axis to move the desired cutting edge into position in rubbing or scraping contact with the tape to be cleaned. When all of the exposed cutting edges of blade 20 have been used, handle 124 then is grasped and pulled toward the operator, i.e. in a direction away from panel 11, thereby loosening locking means or set screw 132. Blade 20 then simply is pulled out of holder 115, inverted and reinserted into blade holder 115 whereby the previously unexposed portion of blade 20 is now exposed thereby presenting a plurality of new cutting edges. Then handle 124 is moved in the opposite direction, i.e. toward panel 11, to tighten set screw 123 to firmly retain blade 20 in holder 115. As a result, the blade holding means 22 of the present invention advantageously doubles the useful life of the blade.

During operation of the apparatus, fan 47 is driven by motor 40 thereby circulating air through the interior of housing 10 through the openings 58, 59 in the side walls thereof together with opening 60 in the rear wall thereof. This provides an effective cooling operation as well as preventing the accumulation of dust and other contaminants within housing 10, and the integral fan and motor arrangement enables the apparatus to be small in size and light in weight. The coupling of the output of motor 40 through belt 42 provided with teeth 42 and gear 44 provides a constant drive on reel 37. This, in turn, draws tape 15 across the cutting edge of blade 20 at a relatively uniform speed. In addition, a constant tension is applied to tape 15 as it is drawn from reel 14 by means 64 as shown in FIG. 4. Advantageously, means 64 is of relatively simple construction thereby contributing to the small size and light weight of the apparatus. The constant tension provided by means 64 together with the constant drive provided by belt 42 and gear 44 contribute to an effective cleaning operation and promote even wearing of the blade cutting edge.

One advantage derived from the provision of the mercury switch in housing 53 is that it requires less force on arm 34 to actuate the switch. In addition the mercury switch does not have any problem of arcing between electrical contacts which can damage the contacts. As shown in FIGS. 4, 5 and 6, front panel 11 of housing 10 is of a laminated or two-part construction. In preferred form the outer, relatively thinner layer is of Formica or similar non-porous material, and the relatively thicker backing layer is of aluminum. The non-porous outer surface prevents absorption of contaminants which allows for ease in cleaning in addition to maintaining a new appearance even after prolonged use of the apparatus.

While blade 20 is illustrated as having a square cross section thereby providing four sharp, right angle cutting edges, blades having different cross sectional shapes are readily usable in the apparatus of the present invention. Different blade cross sections may require minor modifications to the shape of region 117 of blade holder 115, or another blade holder having an outer shape and size identical to that of blade holder 115 with the required cross-sectional configuration of region 117 can be provided for holding a different type blade. Such a blade holder would be readily received in sleeve 128 and operable in a manner identical to that of blade holder 115.

A magnetic tape cleaner constructed according to the present invention can weight approximately 30 pounds so as to be readily portable. Handle 62 is located on housing 10 over the center of gravity thereof, as shown in FIGS. 1 and 3, for easy carrying. The apparatus has a low center of gravity, and there are no places on the machine that could harm the operator.

It is therefore apparent that the present invention accomplishes its intended objects. The construction and operation of blade holding means 22 doubles the useful life of the blade used in the apparatus. Furthermore, the provision of a blade holding member received within another member which is connected to the apparatus enables different types of blades to be used. The construction of reel holding means 16 and 38 compensates for variations in the size of the central openings of tape reels. The integral fan and motor construction together with the relatively simple construction and small size of means 64 enable the apparatus to be small in size, and light in weight so as to be portable. The apparatus is relatively simple in construction and convenient and easy to maintain.

While a single embodiment of the invention has been described with specificity, this is intended by way of illustration, not limitation.

We claim:

1. Apparatus for cleaning magnetic tape comprising:

a. a housing including a supporting surface;

b. tape transport means mounted on said supporting surface for transporting tape to be cleaned from a supply reel to a take-up reel;

c. an elongated blade having a plurality of cutting edges and having a length at least twice the width of the tape to be cleaned;

d. means for releasably holding said blade in a manner such that a portion of the length of said blade at least equal to the width of said tape is exposed and the remaining portion of the length of said blade is within said holding means so as to be unexposed, said blade holding means having a longitudinal axis and holding said blade in a position with the longitudinal axis of said blade parallel to the longitudinal axis of said holding means; and e. means for selectively rotatably connecting said blade holding means to said supporting surface;

f. whereby said blade holding means is selectively movable to place the different cutting edges of said blade successively in contact with the surface of the tape whereupon after all cutting edges of the exposed blade portion have been used said blade can be removed from said holding means and reinserted therein with the previously unexposed blade portion then exposed thereby doubling the useful life of said blade.

2. Apparatus according to claim 1 wherein said blade holding means comprises:

a. a member having a chamber therein for receiving said remaining portion of the length of said blade;

b. stop means in said chamber for contacting an end of said blade to control the amount by which said blade extends into said chamber and thereby to control the length of the exposed portion of said blade; and c. locking means movably connected in said member and extending into said chamber, said locking means being movable into engagement with a surface of the portion of said blade in said chamber for holding said blade in said member.

3. Apparatus according to claim 1 wherein said blade holding means has a cylindrical outer surface portion, the longitudinal axis of which is parallel to the longitudinal axis of said blade when held in said blade holding means, and wherein said means for connecting said blade holding means to said supporting surface comprises:

a. a sleeve member mounted on said supporting member in alignment with an opening in said surface, said blade holding means being positioned with said cylindrical outer surface portion extending through said sleeve and the opening; and b. locking means movably connected in said sleeve member and extending through the inner surface of said sleeve, said locking means being movable into engagement with said outer surface portion of said blade holding means for holding said blade holding means at selected rotational positions thereof.

4. Apparatus according to claim 1 wherein said blade is of square cross-section having four cutting edges mutually parallel to the longitudinal axis of said blade.

5. Apparatus according to claim 1 further including sensing means responsive to the presence of tape in said tape transport means and comprising:

a. mercury switch means pivotably connected to said housing and having first and second states for controlling the operation of said tape transport means; and b. an arm member fixed to said mercury switch and positioned to be supported in a first position by said tape when present in said transport means whereby when said tape is completely unwound from said supply reel said arm moves to a second position thereby changing the state of said mercury switch means.

6. Apparatus according to claim 1 wherein said tape transport means includes shaft means rotatably connected in said housing supporting surface for each said supply and take-up reels and wherein said apparatus further includes self-adjusting brake means connected on said shaft means for said supply reel for applying a constant tension to the tape as it is transported from said supply reel to said take-up reel.

7. Apparatus according to claim 1 wherein each reel has an opening in the center thereof for connection to said apparatus and wherein said apparatus further includes means for holding a reel thereon comprising:

a. shaft means rotatably connected in said housing supporting surface;

b. wheel means mounted on said shaft and having a hub portion on which a reel is placed in a manner such that said hub portion extends into the reel opening;

c. expander means positioned on said hub portion; and d. clamping means connected on said shaft adjacent said wheel means for axial movement toward and away from said expander means;

e. whereby when a reel is placed on said hub and expander means said clamping means is moved axially against said expander means so that said expander means expands radially outwardly from said hub portion into firm contact with the surface of the reel opening so as to firmly hold the reel for rotation with said shaft means.

* * * * *

UNITED STATES PATENT OFFICE
CERTIFICATE OF CORRECTION

Patent No. 3,757,374 Dated September 11, 1973

Inventor(s) John Y. Baskin, Miles D. Bender, Robert D. Daugherty Charles L. Fontana and Samuel G. Johnson It is certified that error appears in the above-identified patent and that said Letters Patent are hereby corrected as shown below:

Claim 6, line 3 after "each" insert --of--.

Signed and sealed this 14th day of May 1974.

(SEAL)
Attest:

EDWARD M.FLETCHER,JR.
Attesting Officer

C. MARSHALL DANN
Commissioner of Patents